United States Patent
Roisin et al.

(10) Patent No.: US 12,442,698 B2
(45) Date of Patent: Oct. 14, 2025

(54) STRAIN SENSOR

(71) Applicant: UNIVERSITE CATHOLIQUE DE LOUVAIN, Louvain-la-Neuve (BE)

(72) Inventors: Nicolas Roisin, Louvain-la-Neuve (BE); Denis Flandre, Louvain-la-Neuve (BE); Nicolas Andre, Louvain-la-Neuve (BE); Thibault Delhaye, Louvain-la-Neuve (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 355 days.

(21) Appl. No.: 18/016,902

(22) PCT Filed: Jul. 30, 2021

(86) PCT No.: PCT/EP2021/071499
§ 371 (c)(1),
(2) Date: Jan. 19, 2023

(87) PCT Pub. No.: WO2022/023571
PCT Pub. Date: Feb. 3, 2022

(65) Prior Publication Data
US 2023/0296455 A1 Sep. 21, 2023

(30) Foreign Application Priority Data
Jul. 30, 2020 (EP) ...................... 20188775

(51) Int. Cl.
*G01L 1/22* (2006.01)
*G01P 15/12* (2006.01)

(52) U.S. Cl.
CPC ............ *G01L 1/225* (2013.01); *G01L 1/2281* (2013.01); *G01P 15/123* (2013.01)

(58) Field of Classification Search
None
See application file for complete search history.

(56) References Cited

U.S. PATENT DOCUMENTS

2018/0330702 A1* 11/2018 Schille .................. G10H 1/386
2021/0325265 A1* 10/2021 Beardsworth ......... G01L 1/2281
2021/0333085 A1* 10/2021 Hong .................... G01L 1/2287

FOREIGN PATENT DOCUMENTS

| CN | 110274703 A | 9/2019 |
| EP | 0363005 A2 | 4/1990 |

(Continued)

OTHER PUBLICATIONS

Chi-Hsiung Wang et al: "Supply voltage and temperature insensitive current reference for the 4 MHz oscillator," Integrated Circuits (ISIC), 2011 13th International Symposium, IEEE Dec. 12, 2011, pp. 35-38.

(Continued)

*Primary Examiner* — Stephanie E Bloss
*Assistant Examiner* — Diana Hancock
(74) *Attorney, Agent, or Firm* — Karceski IP Law. PLLC

(57) ABSTRACT

A strain sensor is based on a self-biasing reference circuit that reaches an operating state that, at least at first order, is at least supply-voltage independent. The strain sensor provides an output signal that is defined by the operating state of the self-biasing reference circuit. At least one component in the self-biasing reference circuit has an electrical characteristic that depends on a strain to which the at least one component is subjected. This makes that the operating state of the self-biasing reference circuit depends on the strain. As a result, the output signal of the strain sensor varies as a function of the strain to which the at least one component is subjected.

15 Claims, 3 Drawing Sheets

(56) References Cited

FOREIGN PATENT DOCUMENTS

JP          S5748607  A    3/1982
WO          0055582   A1   9/2000

OTHER PUBLICATIONS

International Search Report and Written Opinion dated Nov. 4, 2021, for International Patent Application No. PCT/EP2021/071499.
Kody Ray et al: "Low Power Voltage Reference Cells for Sensing Applications Low Power Voltage Reference Cells for Sensing Applications," Graduate Theses, Dissertations, and Problem Reports, Jan. 1, 2019, pp. 1-49, XP055854090, Retrieved from the Internet: URL: https://researchrepository.wvu.edujcgi/viewcontent.cgi?article=8492&context=etd.
Wang Yen-Tin et al: "A CMOS supply-insensitive with 13ppm/° C temperature coefficient current reference," 2013 IEEE 56th International Midwest Symposium on Circuits and Systems (MWSCAS), IEEE, Aug. 3, 2014, pp. 475-478.
Ye Xiaobin et al: "Low voltage self-biasing reference circuits," Internet Article, Oct. 23, 2001, pp. 314-317, XP010576773, ISBN: 978-0-7803-6677-0.

\* cited by examiner

STRAIN SENSOR

CROSS-REFERENCE TO RELATED APPLICATION(S)

This is a National Stage Entry into the United States Patent and Trademark Office from International Patent Application No. PCT/EP2021/071499, filed on Jul. 30, 2021, which relies on and claims priority to European Patent Application NO. 20188775.9, filed on Jul. 30, 2020, the entire contents of both of which are incorporated herein by reference.

FIELD OF THE INVENTION

An aspect of the invention relates to a strain sensor. The strain sensor may be used, for example, to monitor structural health of a mechanical construction. Further aspects of the invention relate to a strain sensor assembly, an integrated circuit, and a measurement system.

BACKGROUND OF THE INVENTION

Strain is an important parameter in monitoring structural health of mechanical constructions, such as, for example, windmills, buildings, bridges, pipelines, cables, and so on. Measuring strain allows predicting possible damage to a mechanical structure. In order to measure strain, the mechanical structure may be provided with a strain sensor at a point of interest to be monitored. There may be various points of interest to be monitored in the mechanical structure, or in a group of such structures. Thus, there may be a whole set of strain sensors for monitoring structural health. In order to facilitate monitoring structural health, a so-called Internet of things network may be deployed that includes the strain sensors.

Patent publication EP0363005A2 describes a sensor that includes a field-effect transistor formed on GaAs for sensing a stress. The field-effect transistor is driven by a constant current or a constant voltage so as to detect a change of an electrical characteristic, such as threshold, due to a stress. When a stress is applied to the field-effect transistor, the transconductance changes, and the temperature changes, consequently the I-V characteristic changes. An AC signal biased by a direct current is supplied to the gate of the field-effect transistor. A drain current is detected in an AC component and a DC component so as to detect a temperature concurrently with a detection of a stress.

SUMMARY OF THE INVENTION

There is a need for an improved strain sensor that allows better performance in at least one of the following aspects: sensitivity, precision, and accuracy.

In accordance with an aspect of the invention a strain sensor is provided. The strain sensor is based on a self-biasing reference circuit that reaches an operating state that, at least at first order, is at least supply-voltage independent. The strain sensor provides an output signal that is defined by the operating state of the self-biasing reference circuit. At least one component in the self-biasing reference circuit has an electrical characteristic that depends on a strain to which the at least one component is subjected. This makes that the operating state of the self-biasing reference circuit depends on the strain. As a result, the output signal of the strain sensor varies as a function of the strain to which the at least one component is subjected.

Such a strain sensor is relatively insensitive to supply voltage variations and, in addition, may also be relatively insensitive to temperature variations. Thus, a relatively high precision and a relatively high accuracy in strain measurement may be achieved. What is more, relatively high sensitivity may also be achieved, in particular compared with conventional metallic strain gauges. A gauge factor about 1000 may be achieved with a strain sensor as defined hereinbefore, whereas the gauge factor of metallic strain gauges is several orders of magnitude lower, limited to about 2. Moreover, a strain sensor as defined hereinbefore may provide a relatively linear measurement characteristic with negligible hysteresis. This allows a relatively simple two-point calibration.

Another advantage is that the strain sensor as defined hereinbefore may operate with low power consumption. This may be even down to a level where the strain sensor can be wirelessly powered, obviating a need for on-board batteries or other energy sources. For example, the strain sensor may be wirelessly powered by a radiofrequency signal, light, vibration, thermal energy, or another environmental energy source that a transducer circuit may convert into electrical power. This makes that the strain sensor is particularly suited to form part of an Internet of things network, which may be wireless.

Moreover, the strain sensor as defined hereinbefore may be relatively small in size and may have a low form factor. This and the low power consumption also makes the strain sensor suitable for applications in, for example, wearable and implanted biomedical devices. In addition, the strain sensor can be manufactured at relatively low cost, which further favors a wide range of applications.

In accordance with a further aspect of the invention, a strain sensor assembly is provided. The strain sensor assembly comprises:

a first strain sensor as defined hereinbefore of which the output signal varies as a function of the strain;

a second strain sensor as defined hereinbefore of which the output signal varies as a function of the strain but inversely with respect to that of the first strain sensor: and a differential output stage arranged to provide an output signal that corresponds with a difference between the output signal of the first strain sensor and the output signal of the second strain sensor.

In accordance with yet further aspects of the invention, an integrated circuit is provided, and a measurement system is provided.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figure 1:
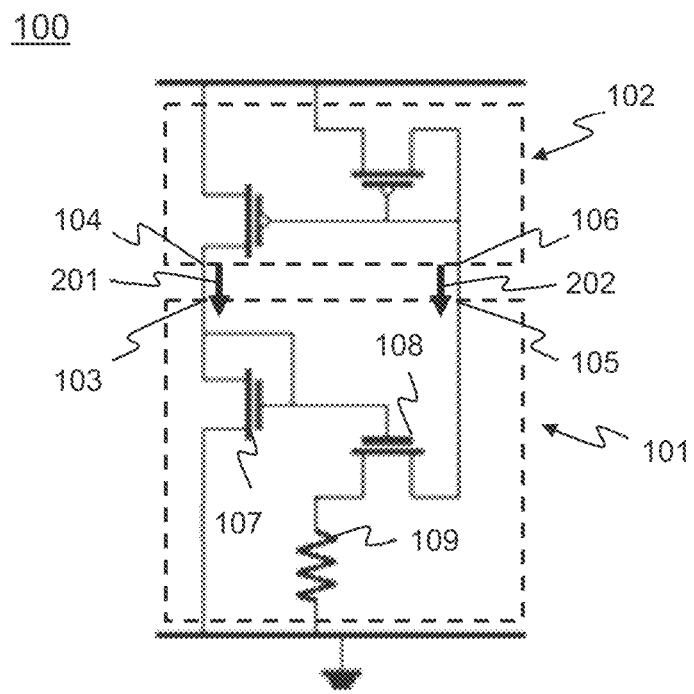
FIG. 1 is a circuit diagram of a basic strain sensor.

FIG. 1 schematically illustrates a basic strain sensor 100. FIG. 1 provides a circuit diagram of the basic strain sensor 100. The basic strain sensor 100 may be fixed to a physical entity that may undergo strain, such as, for example, a structure or a body. The basic strain sensor 100 may be fixed so that any strain that the physical entity undergoes is transferred to the basic strain sensor 100.

The basic strain sensor 100 comprises a sensing circuit 101 and a complementary circuit 102. An input 103 of the sensing circuit 101 is coupled to an output 104 of the complementary circuit 102. An output 105 of the sensing circuit 101 is coupled to an input 106 of the complementary circuit 102. The sensing circuit 101 and the complementary circuit 102 thus form a loop. The basic strain sensor 100 may further comprise a startup circuit, which is not represented in FIG. 1 for the sake of simplicity and convenience.

In this embodiment, the sensing circuit 101 is in the form of a non-linear current-mirror circuit. The non-linear current mirror circuit has an input transistor 107 that operates as a diode, and an output transistor 108 in a common source configuration. The input transistor 107 and the output transistor 108 may be of the field-effect type. These two transistors 107, 108 are oriented differently with respect to each other in the sensing circuit 101. More specifically, the input transistor 107 and the output transistor 108 may be oriented perpendicularly with respect to each other. These transistors may be oriented along particular crystallographic directions of a semiconductor substrate for best strain sensing performance.

The non-linear current mirror circuit comprises a resistance 109 that is coupled between a source of the output transistor 108 and a common circuit node, whereas a source of the input transistor 107 is directly coupled to the common circuit node. The, common circuit node may be, for example, a supply voltage line and may constitute signal ground. The resistance 109 may be provided by a transistor, or an assembly of transistors, as will be illustrated further on.

In this embodiment, the complementary circuit 102 is in the form of a linear current mirror circuit. The sensing circuit 101 and the complementary circuit 102 jointly form a current reference circuit of the beta multiplier type. The basic strain sensor 100 illustrated in FIG. 1 may therefore be regarded as a beta ((3) multiplier current reference circuit in which two field-effect transistors 107, 108 that form a non-linear current mirror are oriented differently. This has the effect that a reference current provided by this circuit varies as a function of strain exerted on a support on which the two field-effect transistors 107, 108 are located. This will be explained in greater detail hereinafter.

Figure 2:
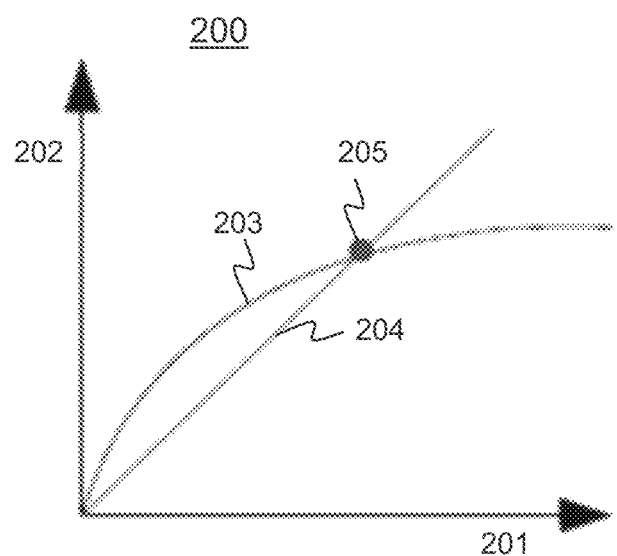
FIG. 2 is a graph in which two transfer functions within the basic strain sensor are plotted.

FIG. 2 illustrates two transfer functions in the basic strain sensor 100. FIG. 2 provides a graph 200 having a horizontal axis that represents a direct current 201 flowing from the output 104 of the complementary circuit 102 in the input 103 of the sensing circuit 101, as indicated in FIG. 1. A vertical axis represents a direct current 202 flowing from the output 105 of the sensing circuit 101 into the input 106 of the complementary circuit 102, as indicated in FIG. 1. The direct current 201 that is represented by the horizontal axis will be referred to hereinafter as left branch current 201 for reasons of convenience. The left branch current 201 is an input current of the sensing circuit 101, as well as an output current of the complementary circuit 102. The direct current 202 that is represented by the vertical axis will be referred to hereinafter as right branch current 202 for reasons of convenience. The right branch current 202 is an output current of the sensing circuit 101, as well as an input current of the complementary circuit 102.

The graph in FIG. 2 comprises two curves 203, 204. A first curve 203 represents a transfer function of the sensing circuit 101. A second curve 203 represents a transfer function of the complementary circuit 102 and, more precisely, represents the inverse thereof. In other words, the first curve 203 represents a relationship between the right branch current 202 and the left branch current 201 defined the sensing circuit 101. The second curve 203 represents a relationship between the left branch current 201 and the right branch current 202 defined by the complementary circuit 102.

FIG. 2 illustrates that the transfer function of the sensing circuit 101 is different from the transfer function of the complementary circuit 102. The transfer function of the sensing circuit 101 is nonlinear, whereas the transfer function of the complementary circuit 102 is substantially linear. The transfer function of the sensing circuit 101 is nonlinear due to the resistance 109 between the source of the output transistor 108 and signal ground. The resistance 109 makes that the transfer function of the sensing circuit 101 has at least a higher order term, such as a quadratic term. The quadratic term is dominant if a voltage drop across the resistance 109 is larger than the square root of a current flowing through the output transistor 108 multiplied by two divided by a gain parameter β of the output transistor 108. The aforementioned current corresponds with the right branch current 202 represented by the vertical axis of the graph FIG. 2.

The basic strain sensor 100 basically operate as follows. The basic strain sensor 100 reaches an operating state 205 indicated in FIG. 2. The operating state 205 is a point where the transfer function of the sensing circuit 101 intersects with the inverse of the transfer function of the complementary circuit. In the operating state 205, the left branch current 201 and the right branch current 202 are in a relationship to each other that is in accordance with the transfer function of the sensing circuit 101 and that of the complementary circuit 102. The operating state 205 may therefore be regarded as an equilibrium state, which depends on the aforementioned transfer functions. It is assumed that the startup circuit mentioned hereinbefore, but not represented in FIG. 1, prevents the basic strain sensor 100 from reaching an operating state at which the aforementioned currents are all zero.

The transfer function of the sensing circuit 101, represented by the first curve 203, varies as a function of the strain that is exerted on the sensing circuit 101. This is because the two transistors 107, 108 in the sensing circuit 101 exhibit a piezoresistive effect and the transistors 107, 108 are oriented differently with respect to each other. The piezoresistive effect makes that the gain parameter β of each of these transistors 107, 108 varies as a function of strain that the transistor undergoes. The different orientation, which may be perpendicular, makes that the two transistors 107, 108 may undergo different degrees of strain. Accordingly, the strain will affect the respective gain parameters β of the two transistors 107, 108 to a different extent. For example, the strain may cause a relatively significant change in the gain parameter β of one transistor, whereas the gain parameter β of the other transistor hardly changes. Since the transfer function of the sensing circuit 101 depends on a ratio between the respective gain parameters β, the transfer function thus varies as a function of strain.

Since the transfer function of the sensing circuit 101 varies as a function of strain, the operating state 205 also varies as a function of strain. Accordingly, the right branch current 202 and the left branch current 201 in the strain sensor, which depend on the operating state 205, also vary as a function of strain. Thus, a value of either of the aforementioned currents represents a degree of strain that the sensing circuit 101 undergoes. The value of the right branch current 202, or that of the left branch current 201, or both, may be read out by means of a further current mirror circuit, which is not represented in FIG. 1 for the sake of simplicity and convenience.

Sensitivity to strain may be improved if the transfer function of the complementary circuit 102 also varies as a function of strain, but inversely with respect to the transfer function of the sensing circuit 101. In this embodiment, this may be achieved by orienting two transistors that make up the linear current mirror also differently with respect to each other, but also differently with respect to the two transistors 107, 108 in the sensing circuit 101.

Importantly, the right branch current 202 and the left branch current 201, which vary as a function of strain, are at least at first order, supply-voltage independent. That is, variations in the supply voltage, such as, for example, noise, are effectively suppressed. Moreover, the right branch current 202 and the left branch current 201 are also relatively insensitive to temperature variations. All this contributes to precise and accurate strain measurement by reading out the right branch current 202, or the left branch current 201, or both.

Figure 3:
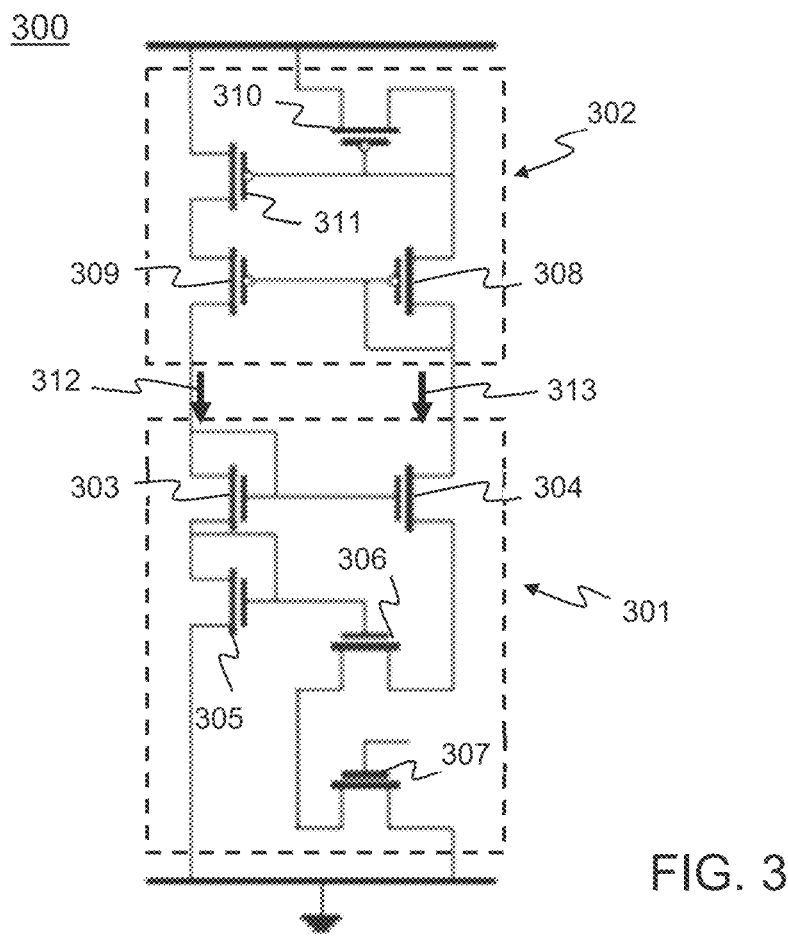
FIG. 3 is a circuit diagram of an improved strain sensor.

FIG. 3 schematically illustrates an improved strain sensor 300. FIG. 3 provides a circuit diagram of the improved strain sensor 300. The improved strain sensor 300 also comprises a sensing circuit 301 and a complementary circuit 302. The sensing circuit 301 is in the form of a nonlinear current mirror in cascode configuration. The complementary circuit 302 of the improved strain sensor 300 is in the form of a linear current mirror in cascode configuration.

In fact, the sensing circuit 301 of the improved strain sensor 300 corresponds with the sensing circuit 101 of the basic strain sensor 100 except for some particularities. The sensing circuit 301 of the improved strain sensor 300 comprises a resistance-providing transistor 307 which. in effect, substitutes the resistance 109 represented in FIG. 1. The resistance-providing transistor 307 may be biased at a zero temperature coefficient point. The resistance-providing transistor 307 may operate in a linear regime, although operation a saturation regime is also possible. It should be noted that the resistance-providing transistor 307 may be formed by an assembly of transistors, which may be coupled in parallel, for example, and oriented such that a resistance is provided that is relatively insensitive to strain. This prevents the resistance from significantly affecting strain sensing. Alternatively, transistors may be oriented such that that the resistance contributes to strain sensing.

The sensing circuit 301 of the improved strain sensor 300 comprises a pair of cascode transistors 303, 304, which have been added with respect to the sensing circuit 101 of the basic strain sensor 100. One of the cascode transistors 303 operates as a diode and is coupled in series with another transistor 305 that operates as a diode, which corresponds to the input transistor 107 in the sensing circuit 101 of the basic strain sensor 100. The other cascode transistor 304 is in a common gate configuration and is coupled in series with another transistor 306 that is in a common source configuration, which corresponds to the output transistor 108 in the sensing circuit 101 of the basic strain sensor 100.

Likewise, the complementary circuit 302 of the improved strain sensor 300 corresponds with the complementary circuit 102 of the basic strain sensor 100 to which a pair of cascode transistors 308, 309 have been added. One of the cascode transistors 308 operates as a diode and is coupled in series with another transistor 310 that operates as a diode.

The other cascode transistor 309 is in a common gate configuration and is coupled in series with another transistor 311 that is in a common source configuration.

The improved strain sensor 300 operates like the basic strain sensor 100 described hereinbefore. A left branch current 312 flows out from the complementary circuit 302 into the sensing circuit 301. A right branch current 313 flows out from the sensing circuit 301 into the complementary circuit 302. The improved strain sensor 300 reaches an operating state. At this point, the left branch current 312 and the right branch current 313 are in a relationship to each other that corresponds to the transfer function of the sensing circuit 301 and that of the complementary circuit 302. The operating state is insensitive to supply voltage variations, as well as to temperature variations.

The improved strain sensor 300 may be even less sensitive to variations in the supply voltage than the basic strain sensor 100. That is, these variations, which may comprise noise, may be suppressed to a greater extent. This is due to the cascode transistors 303, 304, 308, 309 mentioned hereinbefore, which counter a so-called Early effect in transistors 305, 306, 310, 311 in the improved strain sensor 300.

Figure 4:
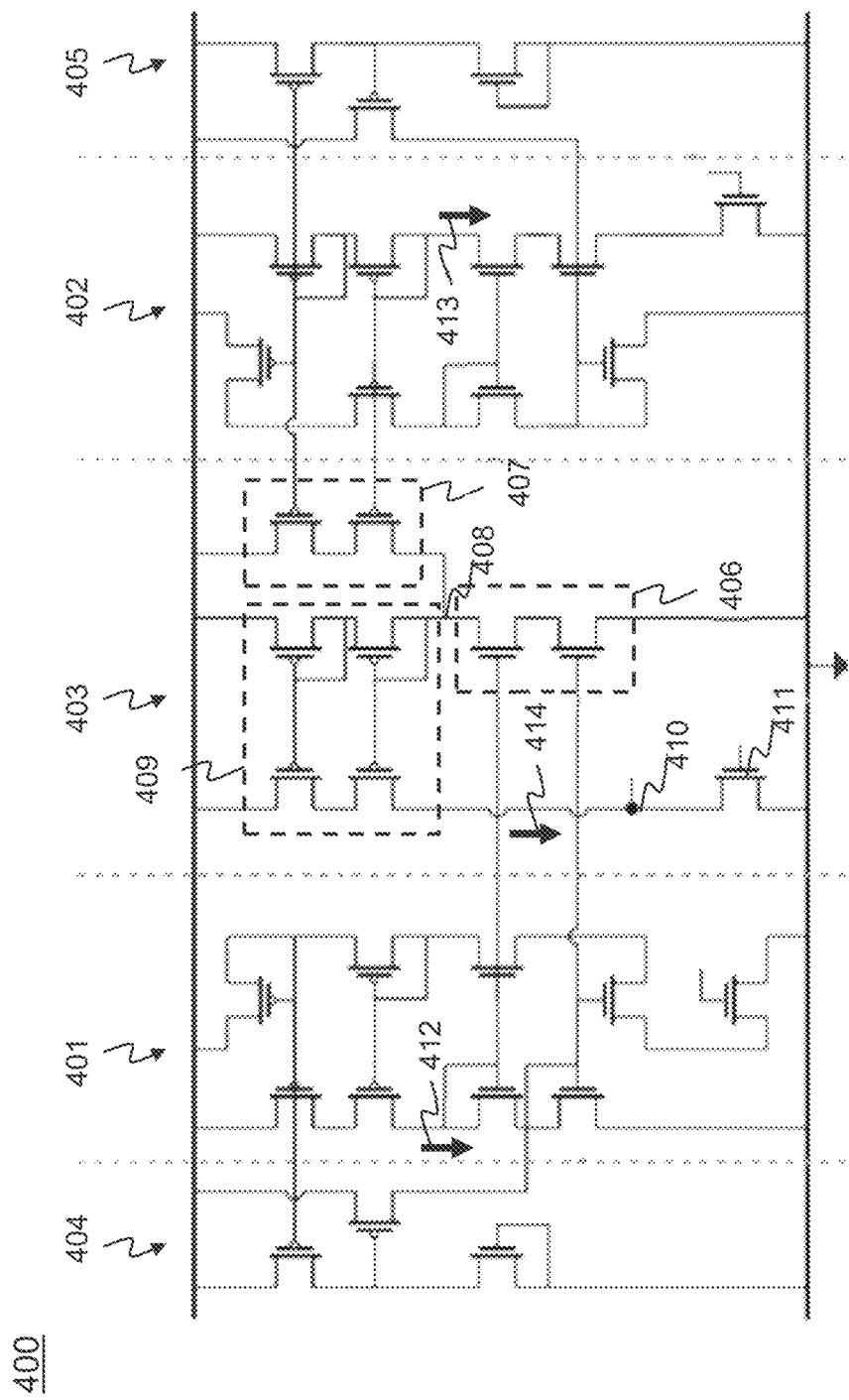
FIG. 4 is a circuit diagram of a strain sensor assembly that includes two improved strain sensors.

FIG. 4 schematically illustrates a strain sensor assembly 400. FIG. 4 provides a circuit diagram of the strain sensor assembly 400. The strain sensor assembly 400 comprises two strain sensors: a first strain sensor 401 and a second strain sensor 402. The first strain sensor 401 corresponds to the improved strain sensor 300 described hereinbefore with reference to FIG. 3. The same applies to the second strain sensor 402. The first strain sensor 401 and the second strain sensor 402 are mirrored versions of each other. The strain sensor assembly 400 further comprises a differential output stage 403 and two start-up circuits 404, 405: a first start-up circuit 404 for the first strain sensor 401 and a second start-up circuit 405 for the second strain sensor 402.

In more detail, the differential output stage 403 comprises a first current-mirroring circuit 406 that is coupled to the first strain sensor 401 and a second current-mirroring circuit 407 that is coupled to the second strain sensor 402. Each of these current-mirroring circuits 406, 407 comprises two transistors in cascode configuration. The first current-mirroring circuit 406 and the second current-mirroring circuit 407 are jointly is coupled to a current subtraction node 408 in the differential output stage 403. The differential output stage 403 further comprises an output current mirror 409 in cascode configuration. An input of the output current mirror 409 is coupled to the current subtraction node 408. An output of the of output current mirror 409 is coupled to an output node 410 of the differential output stage 403, which also constitutes an output node 410 of the strain sensor assembly 400. An output transistor 411 provides a resistance between the output node 410 and signal ground.

The strain sensor assembly 400 basically operates as follows. The first strain sensor 401 and the second strain sensor 402 reach an operating state as described hereinbefore with respect to the improved strain sensor 300 illustrated in FIG. 3. Accordingly, the first strain sensor 401 provides a left branch current 412 that varies as a function of strain. The first current-mirroring circuit 406 mirrors this left branch current 412 to the current subtraction node 408. The second strain sensor 402 provides a right branch current 413 that also varies as a function of strain, but inversely with respect to the left branch current 412 in the first strain sensor 401. The second current-mirroring circuit 407 mirrors this right branch current 413 to the current subtraction node 408.

The current subtraction node 408 thus receives two currents that both vary as a function of strain, but inversely with respect to each other. A differential current, which is a subtraction of these two currents, flows into the input of the output current mirror 409. A mirrored differential current thus flows from the output of the output current mirror 409 into the resistance provided by the output transistor 411. Accordingly, this produces an output voltage at the output node 410 of the strain sensor assembly 400. The output voltage varies as a function of strain. More specifically, the output voltage reflects a differential mode strain measurement jointly accomplished by the first strain sensor 401 and the second strain sensor 402, which, in fact, form a differential pair. This differential mode strain measurement is relatively precise and accurate because the output voltage is relatively insensitive to supply voltage variations, as well as temperature variations, as explained hereinbefore with respect to the basic strain sensor 100 illustrated in FIG. 1.

The strain sensor assembly 400 may be comprised in, for example, an integrated circuit. The integrated circuit may comprise, for example, a transmission circuit capable of wirelessly transmitting strain measurement data to another device in a measurement system. The measurement system may be in the form of, for example, a so-called Internet of things infrastructure. The measurement system may comprise a device that emits a power signal that allows wirelessly powering the basic strain sensor 100. To that end, the integrated circuit, or any other entity of which the strain sensor assembly 400 forms part, may comprise an energy harvesting circuit that generates a power supply voltage for the basic strain sensor 100 on the basis of the power signal received. The aforementioned remarks equally apply to other strain sensor embodiments, such as, for example, the basic strain sensor 100 illustrated in FIG. 1 and the improved strain sensor 300 illustrated in FIG. 3.

Figure 5:
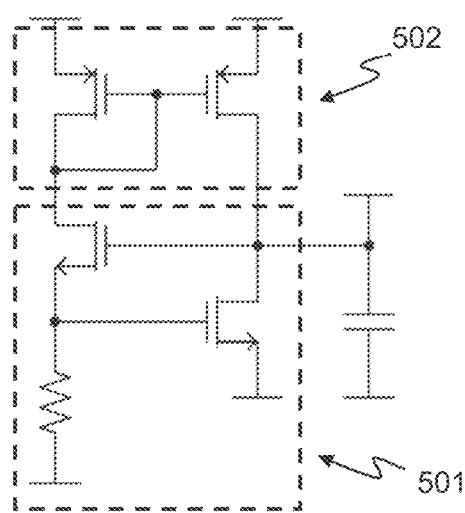
FIG. 5 is a circuit diagram of an alternative strain sensor.

FIG. 5 schematically illustrates an alternative strain sensor 500. FIG. 5 provides a circuit diagram of the alternative strain sensor 500. The alternative strain sensor 500 also comprises a sensing circuit 501 and a complementary circuit 502. In this embodiment, the aforementioned circuits 501, 502 jointly constitute a voltage reference circuit. The sensing circuit 501 comprises two transistors of the field-effect type that are oriented differently with respect to each other. The complementary circuit 502 comprises a current mirror circuit. The alternative strain sensor 500 provides a reference output voltage that varies as a function of strain, whereas the reference output voltage is insensitive to supply voltage variations as well as temperature variations. Thus, the alternative strain sensor 500 also allows precise and accurate strain measurement.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to measuring physical forces. In the embodiments presented hereinbefore, measurement of strain is mentioned. However, the embodiments presented hereinbefore, as well as other embodiments, may be used for measuring another physical force, such as, for example, pressure. For example, a sensor device may comprise a component that converts pressure into strain, which may be measured by a strain sensor in accordance with the invention. Thus, the term "strain sensor" should be understood in a broad sense. This term may embrace any entity capable of measuring a physical force that can be converted into strain.

There are numerous different ways of implementing a strain sensor in accordance with the invention. Various embodiments have been presented with reference to FIGS. 1-4, which are based on a current reference circuit of the beta multiplier type. In addition, another embodiment with reference to FIG. 5 has been presented, which is based on a voltage reference circuit. This is to illustrate that a strain sensor in accordance with the invention may be based on any type of reference circuit that includes a sub circuit having a transfer function that can be made strain dependent. This strain-sensitive sub-circuit then thus forms the sensing circuit in the strain sensor in accordance with the invention. Moreover, strain-sensitive components in the sensing circuit need not necessarily be transistors. Furthermore, transistors in the sensing circuit need not necessarily be of the field-effect type. Alternatives include, for example, bipolar transistors, high-electron-mobility (HEMT) transistors, and heterojunction bipolar (HBT) transistors. A transistor cascode configuration may differ from that in the embodiments presented with reference to FIGS. 3 and 4.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A strain sensor comprising a self-biasing reference circuit arranged to reach an operating state that, at least at first order, is at least supply-voltage independent, the strain sensor providing an output signal that is defined by the operating state of the self-biasing reference circuit, wherein at least one component in the self-biasing reference circuit has an electrical characteristic that depends on a strain to which the at least one component is subjected so that the operating state of the self-biasing reference circuit depends on the strain and, as a result, the output signal of the strain sensor varies as a function of the strain to which the at least one component is subjected, wherein the self-biasing reference circuit comprises:

a sensing circuit including a component having an electrical characteristic that depends on a strain to which the component is subjected so that the sensing circuit has a transfer function from an input to an output that varies as a function of the strain to which the component is subjected; and a complementary circuit having an input coupled to the output of the sensing circuit and an output coupled to the input of the sensing circuit, the complementary circuit having a different transfer function from its input to its output, wherein the operating state of the self-biasing reference circuit is defined by the transfer function of the sensing circuit and the different transfer function of the complementary circuit, and wherein the sensing circuit comprises two strain-sensitive transistors of the field-effect type that affect the transfer function of the sensing circuit, the two transistors being oriented differently with respect to each other on a substrate.

2. A strain sensor according to claim 1, wherein the complementary circuit also includes a component having an electrical characteristic that depends on a strain to which the component is subjected so that the different transfer function of the complementary circuit also varies as a function of strain but inversely with respect to the transfer function of the sensing circuit.

3. A strain sensor according to claim 1, wherein the sensing circuit comprises a non-linear current-mirror circuit having an input transistor that operates as a diode, and an output transistor in a common source configuration with a resistance between source and a common circuit node making that transfer function of the sensing circuit is non-linear.

4. A strain sensor according to claim 3, wherein the resistance is provided by at least one transistor of the field-effect type.

5. A strain sensor according to claim 4, wherein the transistor that provides the resistance is biased at a zero temperature coefficient point.

6. A strain sensor according to claim 4, wherein the transistor that provides the resistance configured to operate in a linear regime.

7. A strain sensor according to claim 3, wherein the non-linear current-mirror circuit in the sensing circuit has a cascode configuration.

8. A strain sensor according to claim 1, wherein the complementary circuit comprises a linear current-mirror circuit, whereby the sensing circuit and the complementary circuit jointly form a current reference circuit of the beta multiplier type.

9. A strain sensor according to claim 8, wherein the linear current-mirror circuit in the complementary circuit has a cascode configuration.

10. A strain sensor assembly comprising:
a first strain sensor and a second strain sensor according to claim 1,
wherein the output signal of the first strain sensor varies as a function of the strain, and
wherein the output signal of the second strain sensor varies as a function of the strain but inversely with respect to that of the first strain sensor; and
a differential output stage arranged to provide an output signal that corresponds with a difference between the output signal of the first strain sensor and the output signal of the second strain sensor.

11. A strain sensor assembly according to claim 10, wherein the first strain sensor and the second strain sensor are mirrored versions of each other.

12. An integrated circuit comprising a strain sensor assembly according to claim 10.

13. A measurement system comprising a strain sensor assembly according to claim 10.

14. An integrated circuit comprising a strain sensor according to claim 1.

15. A measurement system comprising a strain sensor according to claim 1.

\* \* \* \* \*